United States Patent [19]

Schwarz

[11] 4,439,575

[45] Mar. 27, 1984

[54] PROCESS FOR PREPARING AQUEOUS VARNISHES

[75] Inventor: Günther Schwarz, Münster, Fed. Rep. of Germany

[73] Assignee: BASF Farben + Fasern AG, Hamburg, Fed. Rep. of Germany

[21] Appl. No.: 432,945

[22] PCT Filed: Mar. 24, 1982

[86] PCT No.: PCT/DE82/00066

§ 371 Date: Sep. 27, 1982

§ 102(e) Date: Sep. 27, 1982

[87] PCT Pub. No.: WO82/03402

PCT Pub. Date: Oct. 14, 1982

[30] Foreign Application Priority Data

Mar. 31, 1981 [DE] Fed. Rep. of Germany ....... 3112659

[51] Int. Cl.$^3$ .............................................. C08L 91/08

[52] U.S. Cl. .................................... 524/489; 523/333; 523/334; 524/480; 524/475; 524/487; 524/423; 524/436; 524/598

[58] Field of Search ............... 524/480, 475, 487, 489, 524/423, 436, 598; 523/333, 334

[56] References Cited

U.S. PATENT DOCUMENTS 3,232,898 2/1966 Van Loo et al. ................... 524/598
3,965,058 6/1976 Yurchechen ......................... 524/598

*Primary Examiner*—Melvyn I. Marquis
*Attorney, Agent, or Firm*—Wells & Wells

[57] ABSTRACT

Aqueous varnishes containing mineral fillers and/or pigments are prepared by allowing a hot wax emulsion in water at between 80° C. and 100° C. to flow with vigorous stirring into the aqueous varnish containing mineral fillers and/or pigments and to cover at least some of the filler and/or pigment particles with a wax coating. These varnishes show virtually no sedimentation of the solid constituents.

18 Claims, No Drawings

PROCESS FOR PREPARING AQUEOUS VARNISHES

BACKGROUND OF THE INVENTION

The invention relates to a process for preparing aqueous varnishes containing mineral fillers and/or pigments. Virtually no sedimentation occurs in these varnishes.

It is common practice in the coatings industry to prepare varnishes, in particular also aqueous varnishes, which contain mineral fillers and/or pigments. However, their disadvantage is that, on storing the varnishes, not only fillers but also pigments settle out. Depending on the hardness of the deposit, it is difficult or even impossible to stir up and evenly disperse the solids in the varnish. Inorganic fillers, in addition to wax types, are used in practice as flatting agents for delustering the applied varnish film.

SUMMARY OF THE INVENTION

The present object of the invention was to eliminate the disadvantages listed above.

This object is achieved by a process for preparing aqueous varnishes containing mineral fillers and/or pigments, which comprises allowing a hot wax emulsion in water between 80° C. and 100° C., preferably between 95° C. and 100° C., to flow with vigorous stirring into the aqueous varnish containing mineral fillers and/or pigments and to cover at least some of the filler and/or pigment particles with a wax coating.

The amount of wax added to the aqueous varnish should be at least sufficient to be able to coat with wax all the mineral filler and/or pigment particles present in the finish.

DESCRIPTION OF THE PREFERRED EMBODIMENTS

Particularly good results are obtained when 0.5-5 parts by weight of wax are used per 0.1-15 parts by weight of mineral fillers and/or pigments.

Waxes are customary for use as paint additives, namely chiefly to deluster the varnish films. Possible waxes for this purpose are above all those which have a relatively high melting range. Incorporation into the aqueous varnishes is effected by stirring in pulverulent hard wax or from a wax solution or wax pastes.

It was surprising and could not be predicted that a very specific way of incorporating wax into an aqueous varnish would lead to a completely new unexpected property of the finished material, namely a marked lowering of the sedimentation tendency of the solid constituents.

Only when a hot or heated-up wax emulsion at 80° C. to 100° C., preferably 95° C. to 100° C., in water at this temperature is added to an aqueous varnish, is there no sedimentation.

It is important that the aqueous varnish containing mineral fillers and/or pigments is vigorously stirred. As a result, a cone is formed about the stirrer shaft, which cone widens from the bottom to the top and is free of varnish. The most favorable method is to guide the inflowing hot wax emulsion deep into the cone, whereupon the emulsion is most rapidly and most thoroughly dispersed in the varnish.

It has been found that the most favorable result is obtained when the liquid varnish has a temperature of 20° C. If the temperature is lower, the wax in the aqueous varnish becomes more coarse-grained, and if the temperature is higher, the wax becomes too finely dispersed and the surface of the applied film looks spotty and greasy.

If the hot wax emulsion in water is allowed to cool down to a temperature below 80°, the emulsified or dissolved wax starts to reprecipitate at the cloud point. If such a cooled-down wax mixture, which in many cases is present as a gel, is incorporated into the aqueous varnish, no sign of any sedimentation-preventing action can be found.

No patent protection is sought for the preparation of a wax emulsion in water. The preparation is effected by stirring wax flakes or wax powder into hot water initially introduced. This is followed by a short period of boiling at 100° C. until a uniform emulsion is obtained. Generally, a 10-20% by weight emulsion is prepared, which can be diluted with more hot water.

Suitable waxes have a melting point above 60° C. and a cloud point on toluene between 35° C. and 45° C. Particularly suitable waxes of this type are montan waxes, which have been bleached and modified, or ester waxes based on modified montan waxes. The waxes can be coupled with a nonionic emulsifier system.

Suitable aqueous varnishes as a rule contain no organic solvents and are miscible and dilutable with water. Binders are present in aqueous varnishes either in the dissolved form or they are in the form of a dispersion. In respect of binders and varnishes, there are no restrictions, provided they are miscible with water. When using acid-hardening reactive varnishes based on aminoplast resins or phenoplast resins, those mineral fillers must be selected which are acid-resistant.

The mineral fillers also include inorganic flatting agents, the function of which is to deluster the varnish, ie. the surface of a film prepared from a liquid varnish of this type, after the latter has hardened, should look not glossly but matt. The degree of this delustering can be varied within wide limits. However, if the fillers settle out in the varnish and can no longer be stirred up and uniformly dispersed, the desired degree of delustering is no longer reproducible. This circumstance has a particularly significant effect in the case of cabinet finishes or paper coatings containing mineral fillers which appear transparent, so that in spite of the filler content the film remains transparent. These virtually invisible mineral fillers have a refractive index of 1.45-1.47, which corresponds to the refractive index of most synthetic resins. Examples of such mineral fillers are amorphous silicas.

Examples of mineral fillers used in aqueous varnishes include quartz, barium sulfate, chalk and talc. The pigments include all coloring inorganic and organic pigments.

The mean particle size of mineral fillers and/or pigments is below 10 μm. Larger particles are present only in small proportions.

With the aid of the process according to the invention, the sedimentation tendency of mineral fillers and/or pigments is markedly reduced. The varnishes can be stored for a long period without any noticeable sedimentation.

Although at present no exact explanation can be advanced for this phenomenon, all experiments indicate that, when incorporating the hot wax emulsion into the aqueous varnish, individual mineral particles are coated with a wax layer.

The Examples which follow are intended to illustrate the invention but not to restrict it. The percentage data are % by weight, and parts are parts by weight.

EXAMPLE 1

A plasticizer-containing, aqueous varnish which is based on a melamine-formaldehyde resin etherified with methanol and has a binder solids content of 60%, a dispersed content of 5% of amorphous silica having a refractive index of 1.46, and a mean particle size between 2 and 8 $\mu$m, relative to 100 parts of the aqueous varnish, is stirred at 2,000 rpm with the aid of a stirrer. A 10% strength wax emulsion in water, which emulsion is maintained at a temperature of 98° C., is allowed to run slowly into the stirring cone formed in the aqueous varnish. After the addition of the wax emulsion is complete, stirring is continued for some time.

To prepare the wax emulsion, an ester wax based on a bleached and modified montan wax was used. The wax had a melting point of 78° to 80° C., a Höppler cone flow point at 25° C. of about 100 kg/cm$^2$, a penetrometer number of 3.5 at 25° C./100 g/5 seconds, a density at 20° C. of 1.01 to 1.02, an Ubbelohde melt viscosity at 100° C. of about 27 centistokes and a cloud point in toluene of about 39° C. To prepare the wax emulsion, hot water was initially introduced, into which the wax flakes were stirred until they had dissolved to form an emulsion. The mixture was then boiled for a short time and adjusted to 10% by weight of wax. The temperature of 98° C. was maintained until further processing.

The wax-containing aqueous varnish thus prepared showed no sedimentation phenomena even after 4 weeks of storage at 20° C.

In contrast, an aqueous varnish containing the amorphous silica but not the wax showed marked sediment formation after a short time, and the mineral filler had completely sedimented after only 14 days.

EXAMPLE 2

The aqueous varnish containing the mineral filler and described in Example 1 had completely sedimented after standing for 14 days. This varnish was then vigorously stirred up, and the 10% strength aqueous wax emulsion at 98° C. was added in the manner described in Example 1. After all the wax emulsion had been added, the aqueous varnish was stored for a further period. Even after 4 weeks it no longer showed any sedimentation phenomena.

EXAMPLE 3

Example 1 was repeated with the only difference being that the hot wax emulsion was cooled down to room temperature before being added to the aqueous varnish. The resulting paste was then added with stirring to the aqueous varnish.

After only 14 days this varnish formulation showed marked sedimentation phenomena.

I claim:

1. In a process for preventing sedimentation in an aqueous varnish containing additives selected from the group consisting of mineral fillers, pigments and mixtures thereof, the improvement comprising:
   (a) preparing a hot wax emulsion in water by mixing waxes having a melting point above 60° C. and a cloud point on toluene between 35° C. and 45° C. in water at a temperature between 80° C. and 100° C.; and
   (b) adding said hot wax emulsion at said temperature between 80° C. and 100° C. to said aqueous varnish with vigorous stirring.

2. The process of claim 1, wherein 0.5 to 5 parts by weight of said wax are used per 0.1 to 15 parts by weight of said additives.

3. The process of claim 2, wherein said temperature range is 95° C. to 100° C.

4. The process of claim 2, wherein said vigorous stirring is sufficient to produce a cone in said aqueous varnish.

5. The process of claim 2, wherein said liquid varnish has a temperature of 20° C.

6. The process of claim 2, wherein said hot wax emulsion has a wax concentration of 10–20% by weight.

7. The process of claim 6, wherein said wax is a montan wax or an ester based on modified montan waxes.

8. The process of claim 7, wherein said aqueous varnish is based on a melamine-formaldehyde resin etherified with methanol.

9. The process of claim 6, wherein said hot wax emulsion is prepared by stirring said wax into hot water and boiling at 100° C. until a uniform emulsion is obtained.

10. In a process for preventing sedimentation in an aqueous varnish containing additives selected from the group consisting of mineral fillers, pigments and mixtures thereof, the improvement comprising:
    (a) preparing a hot wax emulsion in water by mixing waxes having a melting point above 60° C. and a cloud point in toluene between 35° C. and 45° C. in water at a temperature between 80° C. and 100° C.;
    (b) adding a nonionic emulsifier system to said hot wax emulsion; and
    (c) adding said hot wax emulsion at said temperature between 80° C. and 100° C. to said aqueous varnish with vigorous stirring.

11. The process of claim 10, wherein 0.5 to 5 parts by weight of said wax are used per 0.1 to 15 parts by weight of said additives.

12. The process of claim 11, wherein said temperature range is 95° C. to 100° C.

13. The process of claim 11, wherein said vigorous stirring is sufficient to produce a cone in said aqueous varnish.

14. The process of claim 11, wherein said liquid varnish has a temperature of 20° C.

15. The process of claim 11, wherein said hot wax emulsion has a wax concentration of 10–20% by weight.

16. The process of claim 15, wherein said wax is a montan wax or an ester based on modified montan waxes.

17. The process of claim 16, wherein said aqueous varnish is based on a melamine-formaldehyde resin etherified with methanol.

18. The process of claim 15, wherein said hot wax emulsion is prepared by stirring said wax into hot water and boiling at 100° C. until a uniform emulsion is obtained.

* * * * *